(12) United States Patent
Suda et al.

(10) Patent No.: US 8,061,294 B2
(45) Date of Patent: Nov. 22, 2011

(54) TEMPERATURE-SENSITIVE INDICATOR

(75) Inventors: Hiroshi Suda, Niiza (JP); Atsushi Hirosawa, Hamamatu (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 117 days.

(21) Appl. No.: 12/518,268

(22) PCT Filed: Oct. 2, 2007

(86) PCT No.: PCT/JP2007/001068
§ 371 (c)(1),
(2), (4) Date: Jun. 8, 2009

(87) PCT Pub. No.: WO2008/068881
PCT Pub. Date: Jun. 12, 2008

(65) Prior Publication Data
US 2010/0031868 A1 Feb. 11, 2010

(30) Foreign Application Priority Data
Dec. 6, 2006 (JP) ................. 2006-329394

(51) Int. Cl.
*G01K 11/06* (2006.01)
*G01K 11/12* (2006.01)
(52) U.S. Cl. .............. 116/216; 116/219; 374/106
(58) Field of Classification Search ........... 116/200, 116/201, 205, 206, 216–219, DIG. 28; 374/102, 374/106, 159–162
See application file for complete search history.

(56) References Cited

U.S. PATENT DOCUMENTS

| 3,615,719 | A | * | 10/1971 | Michel et al. | 426/88 |
| 3,786,777 | A | * | 1/1974 | Smith et al. | 116/206 |
| 3,961,530 | A | * | 6/1976 | Helgesson | 374/162 |
| 4,793,717 | A | | 12/1988 | Manske | |
| 4,924,799 | A | * | 5/1990 | Rilling | 116/206 |
| 4,998,827 | A | * | 3/1991 | Holzer | 374/160 |
| 5,368,905 | A | * | 11/1994 | Ohno | 428/34.1 |
| 6,741,523 | B1 | | 5/2004 | Bommarito et al. | |
| 6,916,116 | B2 | * | 7/2005 | Diekmann et al. | 374/102 |
| 6,968,804 | B1 | * | 11/2005 | Barbieri et al. | 116/219 |
| 2010/0043696 | A1 | * | 2/2010 | Suda | 116/216 |

FOREIGN PATENT DOCUMENTS

| JP | 49-40184 A | 4/1974 |
| JP | 57-29829 A | 2/1982 |
| JP | 3-562 B2 | 1/1991 |
| JP | 2003-533706 A | 11/2003 |

* cited by examiner

*Primary Examiner* — Amy Cohen Johnson
(74) *Attorney, Agent, or Firm* — Smith Patent Office

(57) ABSTRACT

To provide a temperature-sensitive indicator which, when using the temperature-sensitive indicator having a capsule packed with a heat-sensitive material, enables easy rupture of the capsule, without being affected by the temperature of a finger of a user. The indicator includes: a base; a concave portion formed in the base; a capsule accommodated in the concave portion and packed with a heat-sensitive material; an absorbing member placed on the capsule; pressing means which is arranged above the absorbing member, and which is formed of a transparent heat insulating material; and a cover which covers at least the capsule and the absorbing member. By pressing on the capsule using the pressing means 6, the capsule is ruptured.

14 Claims, 9 Drawing Sheets

TEMPERATURE-SENSITIVE INDICATOR

BACKGROUND OF THE INVENTION

1. Field of the Invention

This invention relates to a temperature-sensitive indicator which indicates irreversibly that a temperature has risen to a prescribed temperature or higher or has fallen to a prescribed temperature or lower, and in particular relates to a temperature-sensitive indicator that visually enables to confirm exposure to an environment at a prescribed temperature or higher, or at a prescribed temperature or lower.

2. Description of the Related Art

In recent years, temperature management has become important in management of merchandise and products. For example, when handling perishable foods, cut flowers and other perishable items, pharmaceuticals, or semiconductor materials, if products are exposed to temperatures at or above a prescribed temperature without performing adequate temperature management, the quality of the merchandise or product may decline, or there may be degradation, or propagation of bacteria, or spoiling.

Hence strict temperature management of such merchandise and products is necessary not only at the time of production, but during physical distribution and storage as well; and temperature-sensitive indicators are used as one means of continuously monitoring such temperature management.

As such temperature-sensitive indicators, that described in Japanese Examined Patent Application Publication H3-562 (Patent Reference 1) has been proposed. The temperature-sensitive indicator described in Patent Reference 1 is explained based on FIG. 11 and FIG. 12. In the figures, the symbol 51 is a base, and on the upper face of this base 1 is arranged a wall portion 51a which has a ring shape in planar view. Further, on the upper face of the base 51 on the inside of this wall portion 51a is provided a porous pad 52. This porous pad 52 is saturated with a solution of a dye and a chemical material which remains in the solid phase at and below a critical temperature, but at or above the critical temperature changes to the liquid phase.

On the upper-end face of the wall portion 51a is mounted a display core 53. And, the top of the display core 53, and the outer peripheral face of the wall portion 51a, are covered by a cap 54. This cap 54 has a convex shape and is formed into a so-called dome, such that when a certain external force acts, the center portions is collapsed and deformed into a concave shape. The display core 53 is enclosed between this cap 54 and the wall portion 51a, and hold the display core 53. In addition, an adhesive 55 is formed on the rear face of the base 51, and a release liner 56 is provided so as to cover this adhesive 55.

The release liner 56 is peeled from the temperature-sensitive indicator 50 configured in this way, the base 51 is affixed to merchandise or a product, and then, the center portion of the cap 54 is pressed in with a finger to bring the display core 53 into contact with the porous pad 52.

When the product or similar onto which this temperature-sensitive indicator 50 is affixed is exposed to a prescribed temperature or above, the dye in the porous pad 52 changes from the solid to the liquid phase, and due to the concentration gradient between the display core 53 and the porous pad 52, the colored chemical material moves from the porous pad 52 to the display core 53. As a result, by visibly confirming the colored state of the display core 53, it is possible to judge whether the product or similar has been exposed, even once, to an environment at or above a prescribed temperature.

However, with such a temperature-sensitive indicator there are concerns that upon storage in a high-temperature environment the dye may change to the liquid phase and then evaporate, or that the chemical substance solution may evaporate, and so there has been the problem that when storing such temperature-sensitive indicators, temperature management of the temperature of the temperature-sensitive indicator itself is necessary. Moreover, when the center portion of the cap 54 is pressed in with a finger, there is the problem that the temperature of the finger is sensed.

Further, another temperature-sensitive indicator is proposed in Unexamined Utility Model Application Publication No. 57-29829 (Patent Reference 2).This temperature-sensitive indicator is explained based on FIG. 13 and FIG. 14.

In the figures, the temperature-sensitive indicator 60 comprises a base 61; capsules 62, provided on the base 61, into which is packed a mixture of an oil-soluble coloring agent, pigment or dye, mixed with a solid material comprising a straight-chain hydrocarbon or with a composition comprising a straight-chain hydrocarbon (a so-called colored wax); and, filter paper 63, provided so as to cover the capsule 62.

When using this temperature-sensitive indicator 60, a finger is used to exert pressure onto the capsules 61 from above the filter paper 63, to crush the capsules 62. When the temperature rises to a prescribed temperature or higher, the colored wax melts, and the oil-soluble coloring agent, pigment or dye permeates the filter paper. Hence by visibly confirming the coloration state of the filter paper 62, it is possible to judge whether the product or similar has been exposed, even once, to an environment at or above a prescribed temperature.

In this temperature-sensitive indicator 60 described in Patent Reference 2, the so-called colored wax, which is an oil-soluable coloring agent, pigment, or dye mixed with a solid material comprising a straight-chain hydrocarbon or with a composition comprising a straight-chain hydrocarbon, because the so-called colored wax is housed within capsules, evaporation can be suppressed, and management at normal temperatures is possible.

However, a temperature-sensitive indicator such as that described in Patent Reference 1 which judges whether there has been exposure to an environment at or above a prescribed temperature has the problem that, when pressing in the center portion of the cap with a finger, the finger temperature is detected. Similarly, a temperature-sensitive indicator such as that described in Patent Reference 2 has the problem that, when a finger is used to press on and rupture capsules, the so-called colored wax packed inside the capsules is liquefied by the temperature of the finger, so that when capsules are ruptured the filter paper assumes a colored state, and use is no longer possible.

Moreover, the capsules are merely placed on the flat base, so that when the capsules are pressed with the finger, capsules elude the pressing force, and so there is the problem that capsules are not ruptured.

SUMMARY OF THE INVENTION

This invention was devised in order to resolve the above problems, and has as an object the provision of a temperature-sensitive indicator, comprising capsules packed with a heat-sensitive material, such that capsules are easily ruptured when the temperature-sensitive indicator is used. A further object is to provide a temperature-sensitive indicator which, when rupturing the capsules of the temperature-sensitive indicator, is not affected by the finger temperature.

In order to attain the above objects, a temperature-sensitive indicator of this invention comprises: a base; a concave portion formed in the base; a capsule accommodated in the concave portion and packed with a heat-sensitive material; an absorbing member placed on the capsule; a pressing means or member is arranged above the absorbing member, and is formed of a transparent heat insulating material; and a cover which covers at least the capsule and the absorbing member, the temperature-sensitive indicator being characterized in that by pressing the capsule using the pressing means or member, the capsule is ruptured.

In the case of such a temperature-sensitive indicator of this invention, the pressing means or member comprises a transparent and heat insulating material, arranged above an absorbing member, is comprised, and by pressing on the capsule capsule using this pressing means or member, the capsule is ruptured, so that capsule can be ruptured without any effect of the temperature of the pressing finger. Further, because the capsule is accommodated in a concave portion formed in the base, the capsule can be ruptured reliably and easily.

Here, as the heat-sensitive material, so-called colored wax which assumes the liquid phase at or above a prescribed temperature, or a colored gel (product name Slide-Ring Gel, manufactured by Advanced Softmaterials Inc.) which assumes the liquid phase at or below a prescribed temperature, is used.

Such a temperature-sensitive indicator employing a colored gel which assumes the liquid phase at or below a prescribed temperature can be used appropriately with merchandise and products the quality of which is degraded upon freezing, such as for example lettuce, potatoes, tofu, carbonated beverages (beer), and similar.

It is preferable that the pressing member be formed of a synthetic resin placed in contact with the upper face of the absorbing member, that the cover be formed in a convex dome shape which can be collapsed, and that, by causing the cover to collapse and pressing the capsule by the pressing member, the capsule is ruptured. In this way, by a pressing member comprising a transparent and heat insulating material, the capsule is ruptured, so that the effect of heat from the finger is suppressed.

Further, it is preferable that the pressing member, formed in the center portion of the cover formed in a collapsible convex dome shape, be a pressing portion protruding downward, and by causing the cover to collapse and pressing the capsule by the pressing portion, the capsule is ruptured. In this way, when the pressing member is formed on the cover, the number of components can be reduced, and inexpensive manufacture is possible.

Further, it is preferable that the pressing member be fitted to the concave portion formed in the base. Thus when the pressing member mates with the concave portion, the capsule accommodated in the concave portion can be reliably pressed without elusion, and can be ruptured. Further, the pressing member is guided by the concave portion, so that a stable pressing operation is possible.

Further, it is preferable that the absorbing member be formed in a long narrow shape, and that one end portion of the absorbing member be placed over the capsule. The absorbing member is thus formed in a long narrow shape, so that by viewing the distance of the colored portion from one end in the center portion placed on the capsule, the time duration of exposure to an environment at or above a prescribed temperature, or at or below a prescribed temperature, can easily be identified.

Further, it is preferable that the absorbing member be formed in a spiral shape, and that the center portion of the absorbing member be placed on the capsule. The absorbing member is thus formed in a spiral shape, so that by viewing the distance of the colored portion from one end in the center portion placed on the capsule, the time duration of exposure to an environment at or above a prescribed temperature, or at or below a prescribed temperature, can easily be identified. Moreover, compared with a long narrow absorbing member, the temperature-sensitive indicator can be made compact, and can be made smaller.

Further, it is preferable that a display label be formed integrally on the absorbing member.

By a temperature-sensitive indicator of this invention, when using a temperature-sensitive indicator comprising a capsule in which is packed a heat sensitive material, the heat of one's finger has no effect, and the capsule can easily be ruptured.

DESCRIPTION OF THE PREFERED EMBODIMENTS

Figure 1:
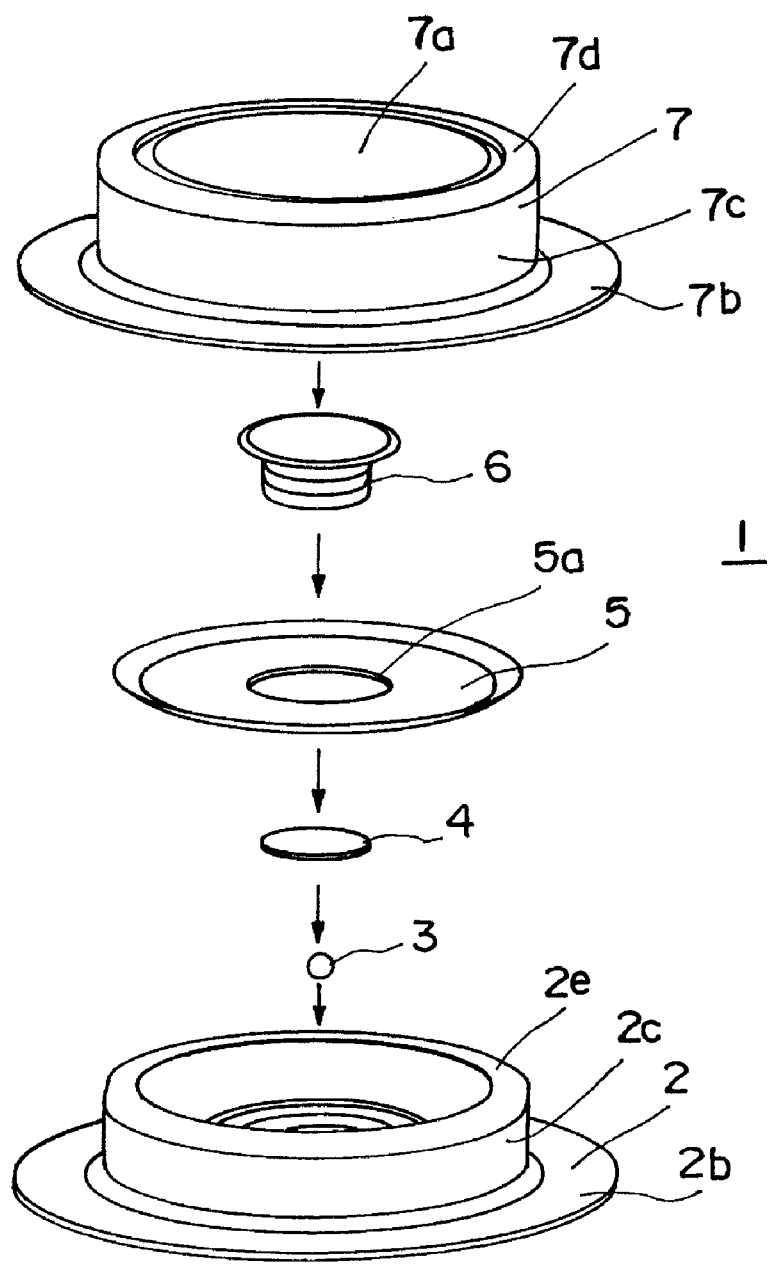
FIG. 1 is an exploded perspective view showing the temperature-sensitive indicator of a first aspect of the invention.
Figure 2:
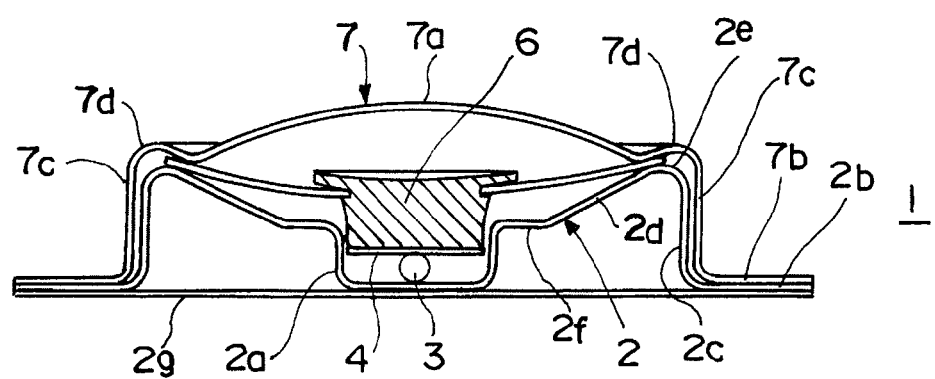
FIG. 2 is a cross-sectional view showing the state before setting of the temperature-sensitive indicator of FIG. 1.
Figure 3:
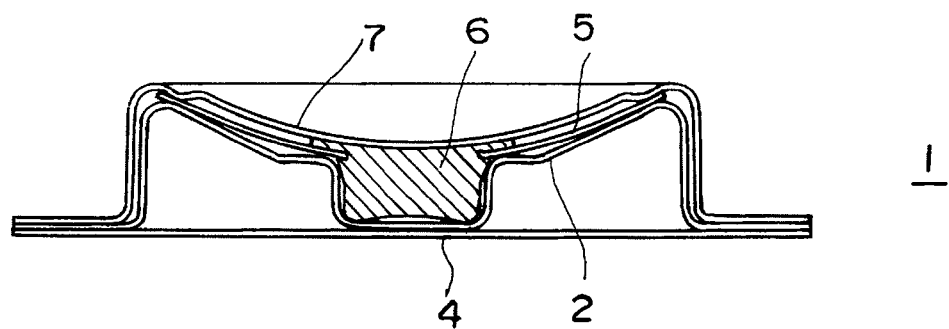
FIG. 3 is a cross-sectional view showing the state after setting of the temperature-sensitive indicator of FIG. 1.

Below, an aspect of the invention is explained based on FIG. 1 through FIG. 3. FIG. 1 is an exploded perspective view showing a temperature-sensitive indicator of one aspect of the invention; FIG. 2 is a cross-sectional view showing the state before setting of the temperature-sensitive indicator shown in FIG. 1; and FIG. 3 is a cross-sectional view showing the state after setting of the temperature-sensitive indicator shown in FIG. 1.

As shown in FIG. 1, this temperature-sensitive indicator 1 comprises a base 2; concave portion 2a formed in the base 2; capsule 3 accommodated within the concave portion 2a; absorbing member 4 placed above the capsule 3; pressing member 6 placed in contact with the upper face of the absorbing member 4; display label 5, in which is formed a penetrating hole 5a through which the pressing member 6 passes; and, convex cover 7, which covers the pressing member 6 and display label 5 from above.

The base 2 is formed in a circular shape in planar view using a synthetic resin material, and comprises a ring shape horizontal portion 2b; erect portion 2c, rising substantially vertically from the horizontal portion 2b; shoulder portion 2e, with a circular arc cross-section, formed at the top of the erect portion 2c; inclined-face portion 2d, falling from the shoulder portion 2e toward the center in a so-called bowl shape; concave portion 2a, formed in the center of the base 2 from the inclined-face portion 2d, with a horizontal portion 2f intervening.

In order to reliably affix this base 1 to merchandise or products, it is preferable that a disc-shape rear plate 2g be provided on the rear face of the ring shape horizontal portion 2b, and that an adhesive or viscous material be formed on the rear face of this rear plate 2g. Here, it is preferable that a peelable paper (not shown) be provided on the adhesive or viscous material, and that at the time of use, this peelable paper be peeled away to enable use.

As the heat-sensitive material packed into the capsule 3, for example, a so-called colored wax, in which an oil-soluble coloring agent, pigment or dye is mixed with a solid material comprising a straight-chain hydrocarbon or with a composition comprising a straight-chain hydrocarbon. Or, as the heat-sensitive material, a chemical substance which is not dissolved by water, but melts or changes color at a prescribed temperature may be used. In the following explanation, colored wax is used as an example.

The absorbing member 4 need only be a member which can absorb the heat-sensitive material, and filter paper, porous members (film, sponge, or similar), silica gel, or other members used in the prior art may be employed.

This absorbing member 4 is formed in a circular shape in planar view, and is formed to have a smaller diameter than the diameter of the concave portion 2a of the base 2. Further, the absorbing member 4 is positioned inside the concave portion 2a even in the state before setting, as shown in FIG. 2, so that falling and shifts in position of the absorbing member 4 are prevented.

The display label 5 has a circular shape in planar view, and at the time of assembly is enclosed and held between the shoulder portion 2e of the base 2 and the cover 7. In the center portion of this display label 5 is formed a penetrating hole 5a, through which the pressing member 6 passes. The pressing member 6 mates with the concave portion 2a, and leaning of the pressing member 6 is prevented, but in addition the holding is performed by penetrating hole of the display label 5, so that leaning of the pressing member 6 is further prevented.

Moreover, when the center portion (the absorbing member 4) is colored (coloration), on the upper face of the display label is written a warning or similar indicating placement in an environment at or above a prescribed temperature.

The pressing member 6 is formed from a transparent member, so as to enable visual confirmation from above of the state of coloring (coloration) of the absorbing member 4. Further, a heat insulating material is used for formation so that, when pressed with a finger, the heat thereof is not readily conveyed to the capsule 3. For example, a transparent synthetic resin material can be used as the material of the pressing member 6.

Further, the cover 7 is formed in a circular shape in planar view using a transparent synthetic resin material, and comprises a ring shape horizontal portion 7b; erect portion 7c rising substantially vertically from the horizontal portion 7b; shoulder portion 7d, with a circular arc cross-section, formed at the top of the erect portion 7c; and inclined-face portion 7a, in a so-called dome shape, rising from the center portion of the shoulder portion 7d toward the center portion. This dome shape inclined-face portion 7a is formed so as to collapse and be deformed from a convex shape into a concave shape as shown in FIG. 3 when an external force acts from above.

By placing the cover 7 on the base 2, the pressing member 6 and the display label 5 are covered from above. At this time, the erect portion 7c mates with the erect portion 2c of the base 2, and the display label 5 is held by the shoulder portion 7d and the shoulder portion 2e of the base 2.

A temperature-sensitive indicator configured in this way is stored in the state shown in FIG. 2. In this state, the colored wax is covered by the capsule 3, so that even when exposed to an environment at or above the prescribed temperature, evaporation of the colored wax is suppressed, and degradation thereof is suppressed.

When this temperature-sensitive indicator is used (set), as shown in FIG. 3, the cover 7 is pressed from above with a finger, deforming the cover 7 into a concave shape, and the pressing member 6 is moved downward. The downward movement of this pressing member 6 is accompanied by rupture of the capsule 3, to achieve the set state.

In the operation to effect the set state, because the pressing member 6 is formed from a heat insulating material, conveyance of heat from the finger to the colored wax is suppressed. Moreover, because the capsule 3 and pressing member 6 are positioned within the concave portion 2a, the capsule 3 can be reliably ruptured without elusion.

Further, because the pressing member 6 is in a state of being mated with the concave portion 2a, the pressing member 6 is guided by the concave portion 2a, and so a stable pressing operation is possible.

And, when a product on which this temperature-sensitive indicator has been affixed is exposed to an environment at or above the prescribed temperature, the colored wax is liquefied and is absorbed by the absorbing member 4. The colored state (coloration state) of the absorbing member 4 can be confirmed visibly from above, through the transparent cover 7 and the transparent pressing member 6. By this means, it is possible to judge whether the product has been exposed, even once, to an environment at or above the prescribed temperature.

Figure 4:
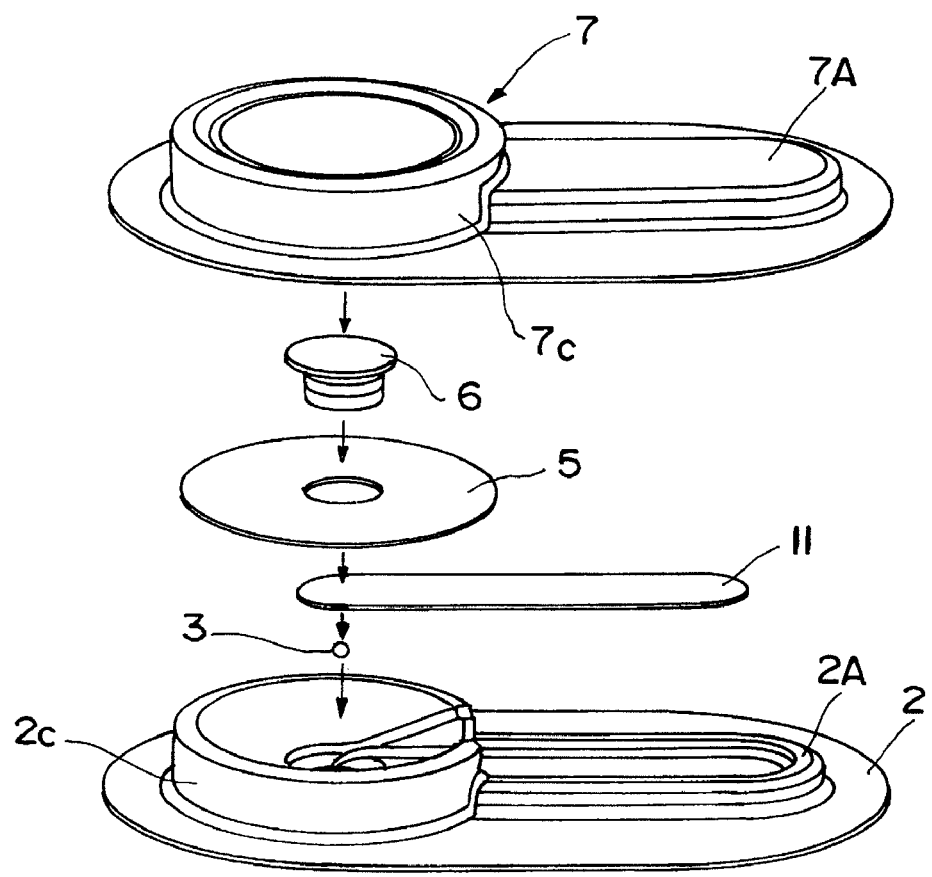
FIG. 4 is an exploded perspective view showing the temperature-sensitive indicator of a second aspect of the invention.
Figure 5:
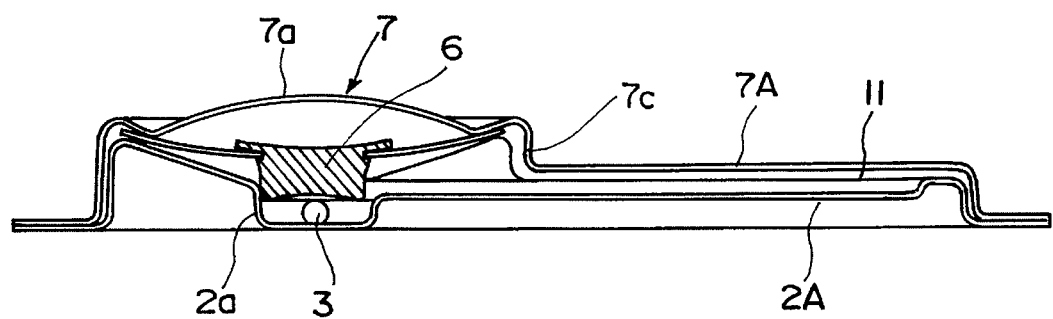
FIG. 5 is a cross-sectional view showing the state before setting of the temperature-sensitive indicator of FIG. 2.

Next, a second aspect of the invention is explained, based on FIG. 4 and FIG. 5. FIG. 4 is an exploded perspective view of the temperature-sensitive indicator of the second aspect of the invention, and FIG. 5 is a cross-sectional view showing the state before setting of the temperature-sensitive indicator shown in FIG. 2. Members which are the same as or equivalent to those in the first aspect are assigned the same symbols, and detailed explanations are omitted.

A characteristic of this second aspect is the forming of the absorbing member into a long narrow shape. As shown in FIG. 4 and FIG. 5, in the base 2, an accommodating portion 2A is formed to accommodate the long and narrow absorbing member 11. This accommodating portion 2A is connected to the erect portion 2c. One end of this absorbing member 11 is accommodated within the concave portion 2a in which the capsule 3 is accommodated, similarly to the first aspect. The cover 7 is also formed with an absorbing member cover portion 7A to cover the long and narrow absorbing member 11. This absorbing member cover portion 7A is connected with the erect portion 7c.

Hence by placing the cover 7 on the base 2, the long and narrow absorbing member 11 can be accommodated within.

In this temperature-sensitive indicator 10, because the absorbing member 11 is formed in a long and narrow shape, by viewing the distance of the colored portion from one end placed on the capsule 3, the time duration of exposure to an environment at or above the prescribed temperature can easily be identified.

That is, at or above the prescribed temperature the colored wax is liquefied, and is absorbed by one end of the absorbing member 11. And, with the passage of time the colored wax gradually permeates toward the other end of the absorbing member 11. Hence by viewing the distance (length) of permeation of the colored wax, the time duration of exposure to an environment at or above the prescribed temperature can easily be identified.

Figure 6:
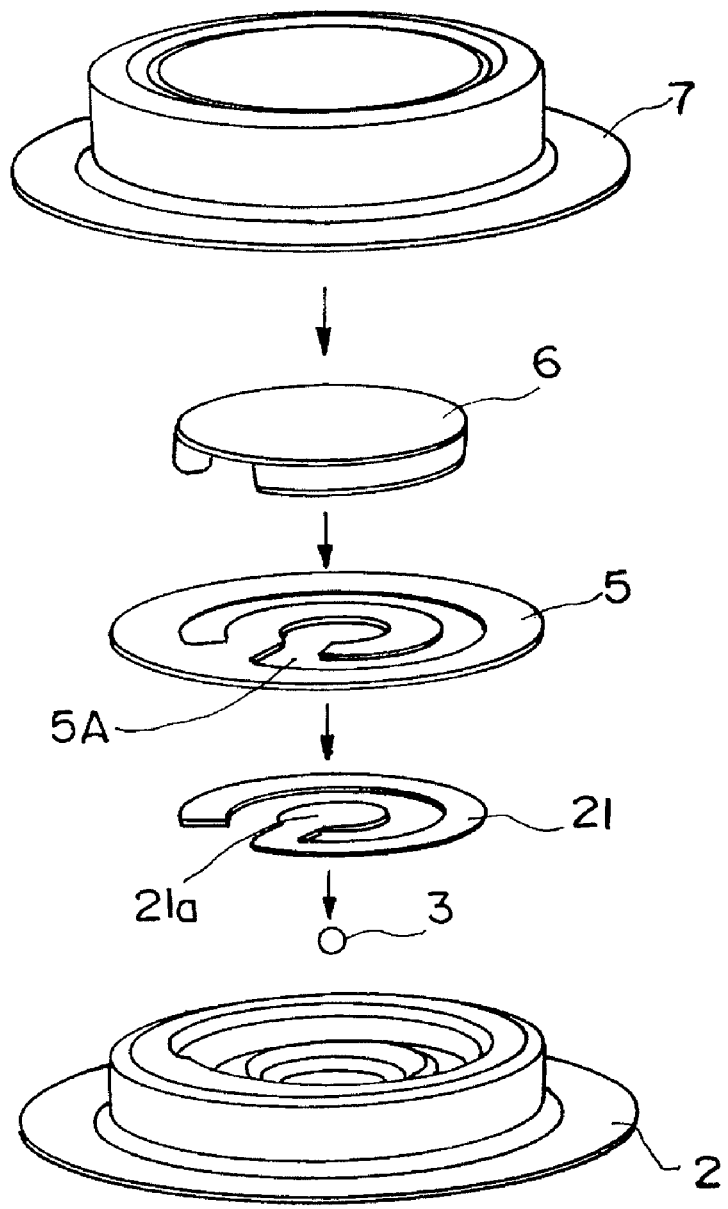
FIG. 6 is an exploded perspective view showing the temperature-sensitive indicator of a third aspect of the invention.
Figure 7:
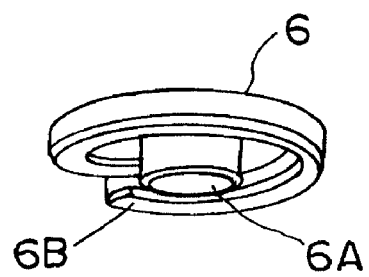
FIG. 7 is a perspective view showing the bottom face of the pressing member shown in FIG. 6.
Figure 8:
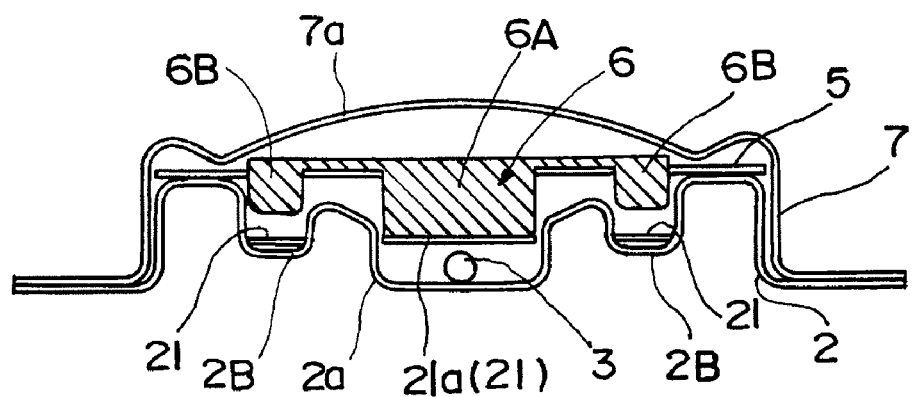
FIG. 8 is a cross-sectional view showing the state before setting of the temperature-sensitive indicator shown in FIG. 6.

Next, a third aspect of the invention is explained based on FIG. 6 through FIG. 8. FIG. 6 is an exploded perspective view showing the temperature-sensitive indicator of the third aspect of the invention, FIG. 7 is a perspective view showing the bottom face of the pressing member shown in FIG. 6, and FIG. 8 is a cross-sectional view showing the state prior to setting of the temperature-sensitive indicator shown in FIG. 6. Members which are the same as or equivalent to those in the first aspect are assigned the same symbols, and detailed explanations are omitted.

A characteristic of this third aspect is the formation of the absorbing member in a spiral shape. As shown in FIG. 6 and FIG. 8, an accommodating portion 2B to accommodate the spiral-shape absorbing member 21 is formed in the base 2. This accommodating portion 2B is connected to the concave portion 2a, and forms a spiral-shape concave portion. The center portion 21a of this spiral-shape absorbing portion 21, similarly to the first aspect, is accommodated within the concave portion 2a which accommodates a capsule 3.

A penetrating hole 5A corresponding to the shape of the spiral-shape absorbing member 21 is formed in the display label 5.

Further, on the pressing member 6 are formed a capsule pressing portion 6A formed in the center, and a spiral-shape protruding portion 6B corresponding to the spiral shape of the absorbing member 21.

This temperature-sensitive indicator 20 has an absorbing member 21 formed in a spiral shape, so that the distance of the colored portion from the end in the center portion 21a placed above the capsule 3 can be seen, and the time duration of exposure to an environment at or above the prescribed temperature can easily be identified.

Moreover, compared to the second aspect, the temperature-sensitive indicator 20 can be made compact and smaller. And, when pressing the pressing member 6, the spiral-shape protruding portion 6B is also guarded by the accommodating portion 2B, so that more stable pressing is possible, without tilting of the pressing member 6.

Further, because the capsule pressing portion 6A and the spiral-shape protruding portion 6B are formed integrally, by pressing the pressing member 6, the spiral-shape protruding portion 6B can press the absorbing member 21 from above. As a result, the absorbing member 21 can be held within the accommodating portion 2B without flexion, and a certain degree of visibility can be secured.

Further, the capsule pressing portion 6A is formed such that the height is higher than that of the spiral-shape protruding portion 6B. In other words, the spiral-shape protruding portion 6B is formed so as to be lower than the height of the capsule pressing portion 6A. Hence when the cover 7 is collapsed and deformed, the concave deformed state can be maintained. Also, a constant force acts on the capsule ruptured by the capsule pressing portion 6A, so that more stable permeation action is obtained.

Figure 9:
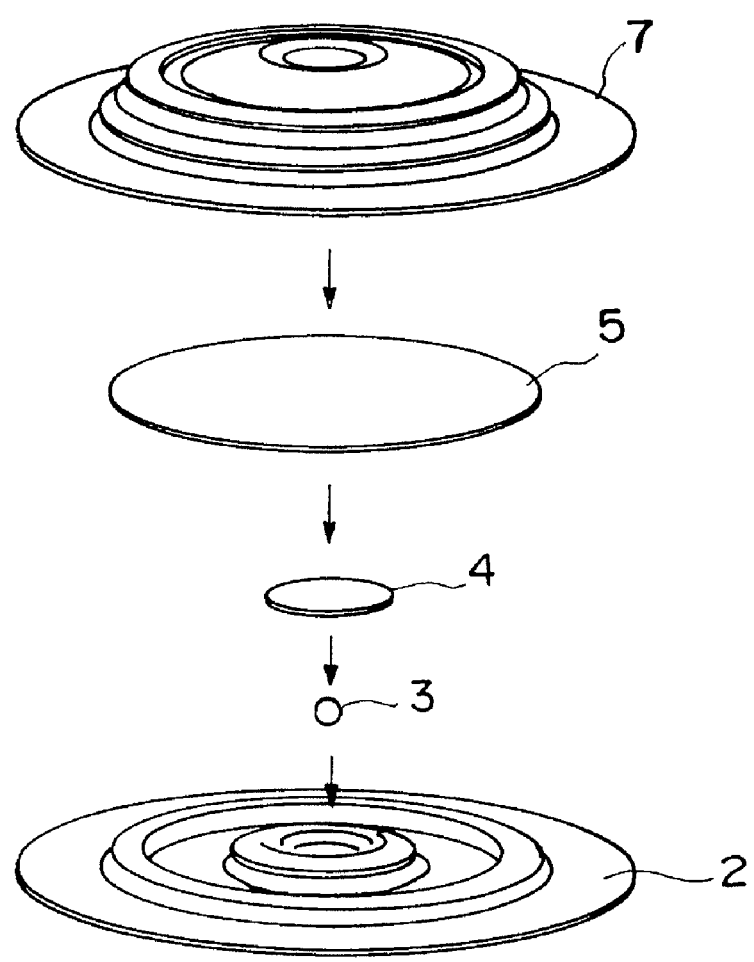
FIG. 9 is an exploded perspective view showing the temperature-sensitive indicator of a fourth aspect of the invention.
Figure 10:
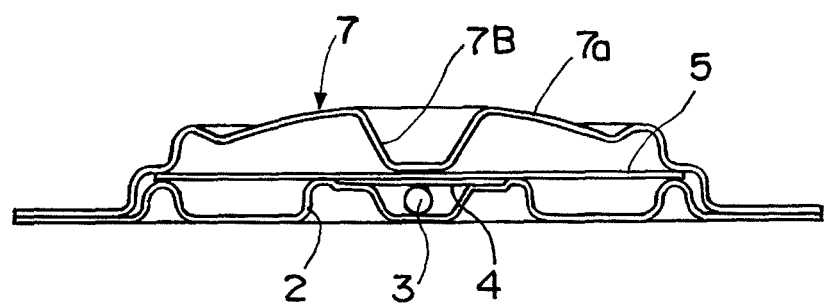
FIG. 10 is a cross-sectional view showing the state before setting of the temperature-sensitive indicator shown in FIG. 9.
Figure 11:
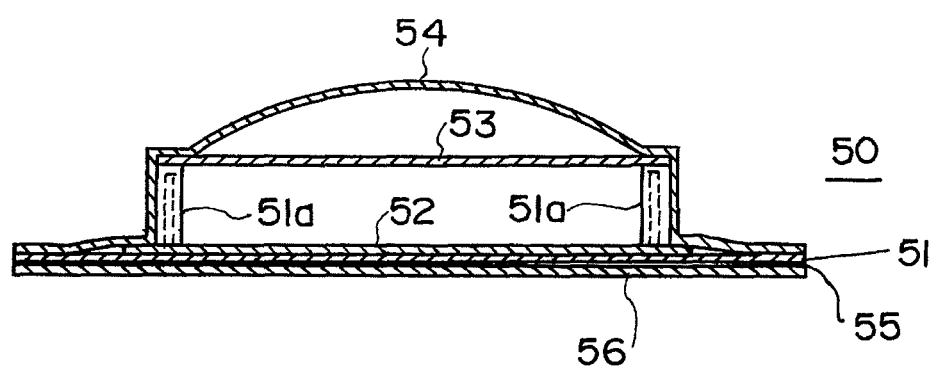
FIG. 11 is a cross-sectional view showing a temperature-sensitive indicator of the prior art.
Figure 12:
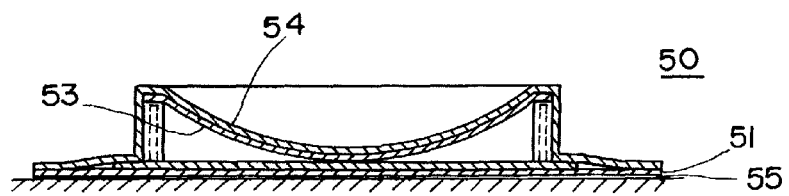
FIG. 12 is a cross-sectional view showing the state before setting of the temperature-sensitive indicator shown in FIG. 11.
Figure 13:
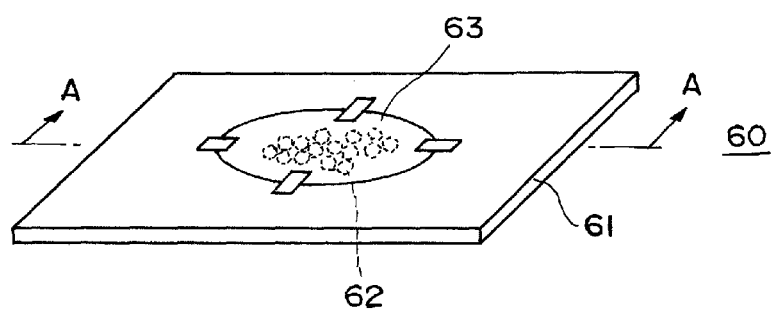
FIG. 13 is a perspective view showing a temperature-sensitive indicator of the prior art.
Figure 14:
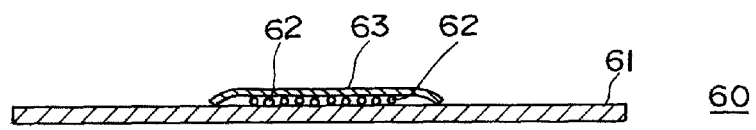
FIG. 14 is a cross-sectional view showing the temperature-sensitive indicator shown in FIG. 13.

Next, a fourth aspect of the invention is explained based on FIG. 9 and FIG. 10. FIG. 9 is an exploded perspective view of the temperature-sensitive indicator of the fourth aspect of the invention, and FIG. 10 is a cross-sectional view showing the state before setting of the temperature-sensitive indicator shown in FIG. 9. Members which are the same as or equivalent to those in the first aspect are assigned the same symbols, and detailed explanations are omitted.

A characteristic of this fourth aspect is the integral formation of the pressing member with the cover 7.

As shown in FIG. 7, a pressing portion 7B protruding downward (inside) is formed in the center portion of the inclined-face portion 7a of the cover 7. This cover 7 is formed from a synthetic resin having transparency and a heat insulation effect.

In this temperature-sensitive indicator 30, a pressing portion is formed on the cover 7, so that by pressing the inclined-face portion 7a of the cover 7, the pressing portion 7B ruptures the capsule 3, and the set state can be attained. Moreover, compared with the first aspect, the number of components can be reduced, so that inexpensive manufacture is possible. And, as in the first aspect, the absorbing member 4 and the display label 5 may be formed separately; but as shown in FIG. 10, the absorbing member 4 and the display label 5 may be formed integrally.

In the above aspects, cases were explained in which the capsule was packed with a so-called colored wax, which is an oil-soluble coloring agent, pigment, or dye mixed with a solid material comprising a straight-chain hydrocarbon or with a composition comprising a straight-chain hydrocarbon. However, as the heat-sensitive material, in addition to the above colored wax which assumes the liquid phase at or above a prescribed temperature, colored gels which assume the liquid phase at or below a prescribed temperature (product name Slide-Ring Gel, manufactured by Advanced Softmaterials Inc.) can be used.

A temperature-sensitive indicator using such a colored gel which assumes the liquid phase at or below a prescribed temperature can be used appropriately with merchandise and products the quality of which is degraded upon freezing, such as for example lettuce, potatoes, tofu, carbonated beverages (beer), and similar.

Further, in the above first through third aspects, cases were explained in which the pressing member mates with the concave portion formed in the base; but the shape and dimensions of the pressing member may be formed to be larger than the shape and dimensions of the concave portion, so that while pressing and widening the concave portion, the capsule is ruptured.

Also, in the above first through fourth aspects, examples were explained in which the display label was held between the base and cover; but a display label, or display label integrally formed with the absorbing member, may be bonded or affixed to the base. By means of such a configuration, the base and the cover shoulder portion shape can be simplified, and molding costs can be reduced. Also, the number of assembly steps can be reduced, and products can be manufactured inexpensively.

A temperature-sensitive indicator of this invention can be used appropriately in the fields of production, physical distribution, and storage of products and merchandise for which temperature management is necessary, such as perishable foods, frozen foods, cut flowers, pharmaceuticals, semiconductor materials, and similar.

What is claimed is:

1. A temperature-sensitive indicator, comprising a base; a concave portion formed in the base; a capsule accommodated in the concave portion and packed with a heat-sensitive material; an absorbing member placed on the capsule; a pressing member which is arranged above the absorbing member, and which is formed of a transparent heat insulating material; and a cover which covers at least the capsule and the absorbing member, wherein the pressing member, formed in a center portion of the cover formed in a collapsible convex dome shape, is a pressing portion protruding downward, and by causing the cover collapse and pressing the capsule by the pressing portion, the capsule is ruptured.

2. The temperature-sensitive indicator according to claim 1, wherein the heat-sensitive material is a so-called colored wax which assumes a liquid phase at or above a prescribed temperature, or a colored gel which assumes a liquid phase at or below a prescribed temperature.

3. The temperature-sensitive indicator according to claim 1, wherein the pressing member is formed of a synthetic resin placed in contact with an upper face of the absorbing member, the cover is formed in a convex dome shape which can be collapsed, and by causing the cover to collapse and pressing on the capsule by the pressing member, the capsule is ruptured.

4. The temperature-sensitive indicator according to claim 1, wherein the pressing member is fitted to the concave portion formed in the base.

5. The temperature-sensitive indicator according to claim 1, wherein the absorbing member is formed in a long narrow shape, and one end portion of the absorbing member is placed over the capsule.

6. The temperature-sensitive indicator according to claim 1, wherein the absorbing member is formed in a spiral shape, and the center portion of the absorbing member is placed on the capsule.

7. The temperature-sensitive indicator according to claim 1, wherein a display label is formed integrally on the absorbing member.

8. A temperature-sensitive indicator, comprising a base; a concave portion formed in the base; a capsule accommodated in the concave portion and packed with a heat-sensitive material; an absorbing member placed on the capsule; a pressing member which is arranged above the absorbing member, and which is formed of a transparent heat insulating material; and a cover which covers at least the capsule and the absorbing member, wherein the pressing member, formed in a center portion of the cover formed in a collapsible convex dome shape, is a pressing portion protruding downward, and by causing the cover collapse and pressing the capsule by the pressing portion, the capsule is ruptured and the pressing member penetrates a label member.

9. The temperature-sensitive indicator according to claim 8, wherein the heat-sensitive material is a so-called colored wax which assumes a liquid phase at or above a prescribed temperature, or a colored gel which assumes a liquid phase at or below a prescribed temperature.

10. The temperature-sensitive indicator according to claim 8, wherein the pressing member is formed of a synthetic resin placed in contact with an upper face of the absorbing member, the cover is formed in a convex dome shape which can be collapsed, and by causing the cover to collapse and pressing on the capsule by the pressing member, the capsule is ruptured.

11. The temperature-sensitive indicator according to claim 8, wherein the pressing member is fitted to the concave portion formed in the base.

12. The temperature-sensitive indicator according to claim 8, wherein the absorbing member is formed in a long narrow shape, and one end portion of the absorbing member is placed over the capsule.

13. The temperature-sensitive indicator according to claim 8, wherein the absorbing member is formed in a spiral shape, and the center portion of the absorbing member is placed on the capsule.

14. The temperature-sensitive indicator according to claim 8, wherein a display label is formed integrally on the absorbing member.

* * * * *